United States Patent [19]

Hayashi

[11] 4,276,317

[45] * Jun. 30, 1981

[54] METHOD FOR PROCESSING BREAD DOUGH

[76] Inventor: Torahiko Hayashi, 3-4, Nozawa-machi, Utsunomiya-shi, Tochigi-ken, Japan

[*] Notice: The portion of the term of this patent subsequent to Aug. 10, 1993, has been disclaimed.

[21] Appl. No.: 30,015

[22] Filed: Apr. 16, 1979

Related U.S. Application Data

[60] Continuation of Ser. No. 846,993, Oct. 31, 1977, abandoned, which is a division of Ser. No. 552,760, Feb. 25, 1975, Pat. No. 4,056,346.

[30] Foreign Application Priority Data

Feb. 25, 1974 [JP] Japan .................................. 49-22041

[51] Int. Cl.³ .......................... A21D 6/00; A21D 8/00
[52] U.S. Cl. .................................... 426/501; 426/502; 426/503; 426/517

[58] Field of Search ................. 426/18, 19, 27, 549, 426/496, 500, 501, 502, 503, 512, 517, 518; 264/241, 288, 291; 425/335, 337, 371, 372, 373, 101, 230, 232, 320, 315, 363, 455 R, DIG. 53

[56] References Cited

U.S. PATENT DOCUMENTS

| | | | |
|---|---|---|---|
| 1,134,970 | 4/1915 | Lawrence | 425/337 |
| 2,264,115 | 11/1941 | Grainger et al. | 426/502 X |
| 2,431,074 | 11/1947 | Palmer | 426/500 X |
| 2,633,242 | 3/1953 | Rhodes | 425/101 X |
| 2,642,013 | 6/1953 | Enoch | 425/337 X |
| 2,735,382 | 2/1956 | Hansen | 426/501 X |
| 2,888,888 | 6/1959 | Jorgenson et al. | 426/501 X |
| 3,116,703 | 1/1964 | Enoch et al. | 425/320 X |
| 3,191,553 | 6/1965 | Rich et al. | 425/373 |
| 3,225,717 | 12/1965 | Page | 426/501 |
| 3,973,895 | 8/1976 | Hayashi | 425/373 X |
| 3,991,220 | 11/1976 | Gunther | 426/502 |

*Primary Examiner*—Arthur L. Corbin
*Attorney, Agent, or Firm*—Guy W. Shoup; Gerard F. Dunne

[57] ABSTRACT

A method for the shaping and cutting of bread dough which forms the dough into a strip, stretches the dough by applying pulling forces to said strip, cuts the dough and overlaps the dough.

3 Claims, 10 Drawing Figures

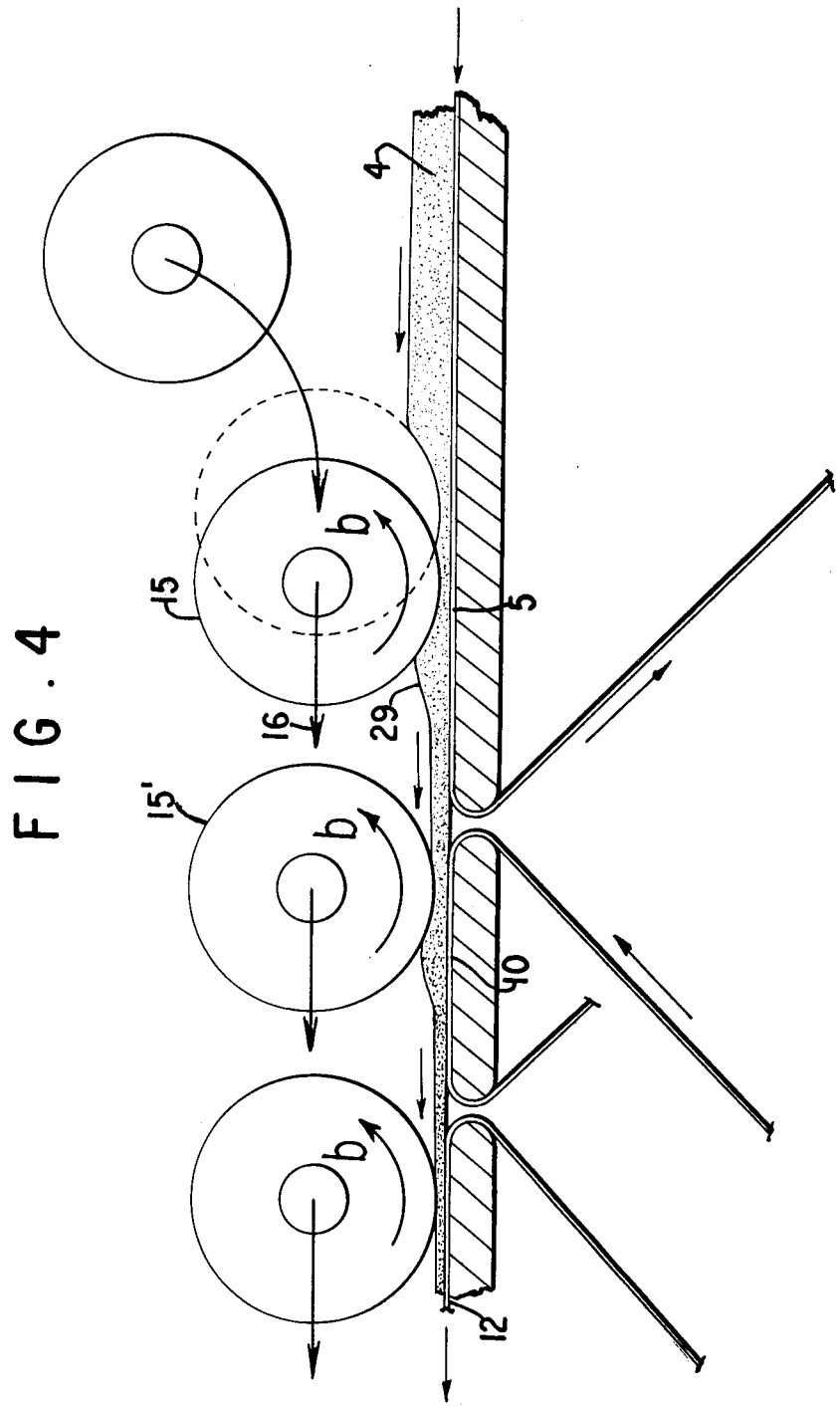

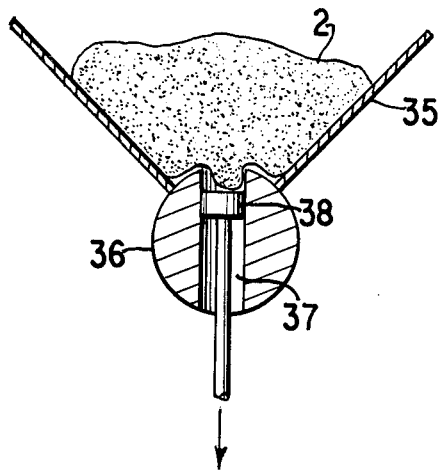
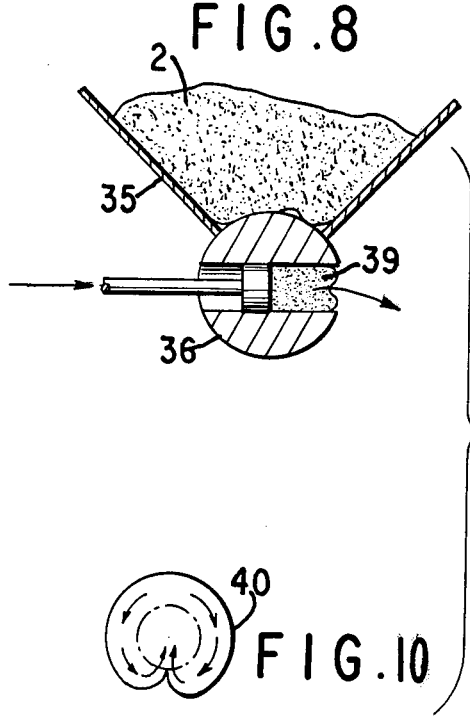
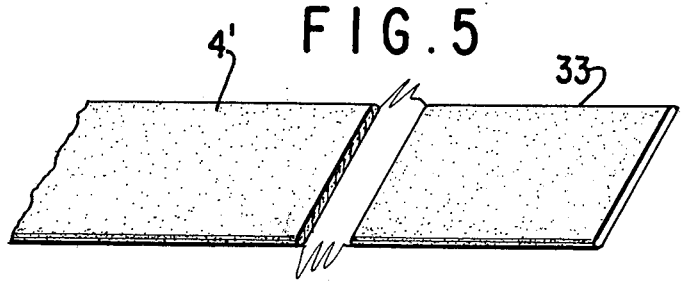
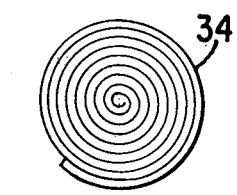

METHOD FOR PROCESSING BREAD DOUGH

This application is a continuation of Application Ser. No. 846,993 filed Oct. 31, 1977, now abandoned, which is a division of Application Ser. No. 552,760, filed Feb. 25, 1975, and issued as U.S. Pat. No. 4,056,346.

This invention is concerned with improvements over the prior art in apparatus and method for manufacturing bread and like products. The prior art requires a certain period of time, known as intermediate fermentation, and subsequent dough reshaping prior to final fermentation, thus requiring both highly complex operating equipment for such intermediate fermentation and, additionally, a device for such dough reshaping prior to final fermentation. Large spaces are required for such equipment.

The present invention has dispensed with both intermediate fermentation and the dough reshaping processes, and, consequently, the large space area and equipment required.

This invention concerns itself with a device for, and a method of cutting and shaping of dough, which, after being subjected to a final kneading operation, is shaped into a substantially bar-form or substantially belt-form continuous body of 1 to 4 mm. thickness by means of a stretching apparatus and then cut into pieces of a predetermined length, which pieces may then be rolled, coiled or folded.

FIGS. 7 through 10 show, generally, the prior apparatus and method of cutting dough in manufacturing bread and like products. Rotor 36 is disposed under dough tank 35. A cylinder 37 is disposed in rotor 36. Piston 38 moves back and forth in cylinder 37; withdrawal of piston 38 causes dough 2 to be sucked or drawn from dough tank 35 into cylinder 37. The dough thus sucked or drawn is separated from the dough in the dough tank when rotor 36 is rotated to assume the position shown in FIG. 8. The cut dough is discharged from cylinder 37 when piston 38 moves forward. This process is constantly repeated. However, the cut dough 39, as shown in FIG. 9, does not take any uniform shape nor does it have a flat and smooth surface.

This conventional prior art method for cutting dough thus "bites off" a mass of dough and is, in effect, "three-dimensional" cutting, where the entire surface of the dough thus cut from a dough mass is rough. The otherwise continuous gluten tissue of the dough cut from the dough mass is ruptured to a depth of several mm. Thus, this conventional prior art method requires a second step where said rough surface is shifted mechanically into the center portion of the cut dough mass as shown in FIG. 10. The original center portion of the cut dough mass, having strong gluten tissue, is caused to move outwardly and to form a fresh surface of dough to envelop the newly formed center portion, thus covering the surface of the dough with dynamically uniform elastic tissue, and retaining the spherical form of the cut dough mass.

The third stage required in conventional prior art processing is the act called intermediate fermentation, in which the fractured or ruptured gluten tissue in the center portion of the dough is restored to an unbroken form through spontaneous oxidation.

The fourth stage in conventional prior art processing is the dough flattening stage, usually called the gas removal stage where the sizes of gas bubbles produced during the third stage is equalized, and spherical gas bubbles are flattened and made to entangle with one another, thereby forming a bread structure which contains gas bubbles where the walls, which separate them from adjacent gas bubbles, are very thin.

The above apparatus and methods are required in conventional processing, because the fragmentation of a large volume of dough into small pieces precedes all of the processing stages for the manufacture of bread, and because the cutting of bread dough is "three-dimensional", thus destroying gluten tissue, and, therefore, requires a subsequent gluten tissue restoration stage. Dough deterioration often results from such conventional processing.

The improvements of this invention place emphasis on the prevention of deterioration of the dough caused by cutting, and employs for this purpose a so-called "two-dimensional" splitting, where the cutting surface of the apparatus, and hence the cut surface of the dough, is quite small. In preparing dough for cutting, this invention also employs a novel combination of elements and steps for dough stretching as will be elaborated below; in the present invention, the thickness of the dough prepared by this apparatus and method is in the range of 1 to 4 mm. Bread and like products of high quality cannot be obtained when the thickness of such dough is 5 mm. or above. The figures as to dough thickness represent the thickness immediately after it has been stretched and before said dough contracts through elasticity.

The reason dough thickness is important is explained as follows. As time passes, there are formed innumerable gas bubbles in the dough; as the bubbles grow, the dough interior becomes sponge-like. This is equivalent to cutting of the continuous gluten tissue, and requires the restoration of the gluten tissue in some way to obtain a dough with homogeneous quality. If, for example, the dough is vigorously stirred under compression to obtain such quality, the gluten tissue will be generally weakened. Furthermore, even if the dough is compressed just to expel the gas, the already cut gluten tissue will not be restored unless the dough is left to stand for a considerable length of time.

The present invention solves this difficulty by reducing the thickness of the dough evenly to that of the dough film forming a wall between adjacent gas bubbles in the dough, thereby obtaining homogeneity of the dough. The thickness of the dough film between the gas bubbles is infinitely variable. However, in the case of a dough mass of the weight of 20 kg. or more, up until 30 minutes after final kneading of the dough at a temperature of 25°–30° C., the dough-dividing action by means of gas very seldom produces dough films between adjacent gas bubbles of less than 2 mm. in thickness.

Accordingly, even 30 minutes after final kneading, it will be possible to make homogeneous dough by reducing the thickness thereof to 2 mm. or less, such reducing being effected through the introduction of a stretching force.

Experiments show that when the thickness of dough is reduced by stretching to not more than 2 mm., by viewing the transmission of light through the dough, any unevenness of the density of dough is extremely difficult to see, as the dough has extremely high homogeneous elasticity. However, when the dough is not stretched to less than about 5 mm. thickness, the unevenness of the gluten tissue cannot be eliminated.

It is also desirable to limit the contraction of the dough after it is stretched.

In a final stage of the process, there is required the rolling up by a suitable apparatus of a thin dough strip of a predetermined length, or the same rolling up and subsequent shaping of the dough into a spherical form.

A description of the drawings is as follows:

FIG. 4 illustrates the flattening action of the apparatus as shown in FIG. 3;

FIGS. 5 and 6 illustrate the dough as generally shaped by the present invention;

FIGS. 7 and 8 illustrate the conventional prior art apparatus and method for cutting and shaping dough;

FIG. 9 illustrates a dough mass after it is cut by the conventional prior art apparatus and methods;

FIG. 10 illustrates the reforming of the dough mass necessitated by prior art apparatus and methods.

Figure 1:
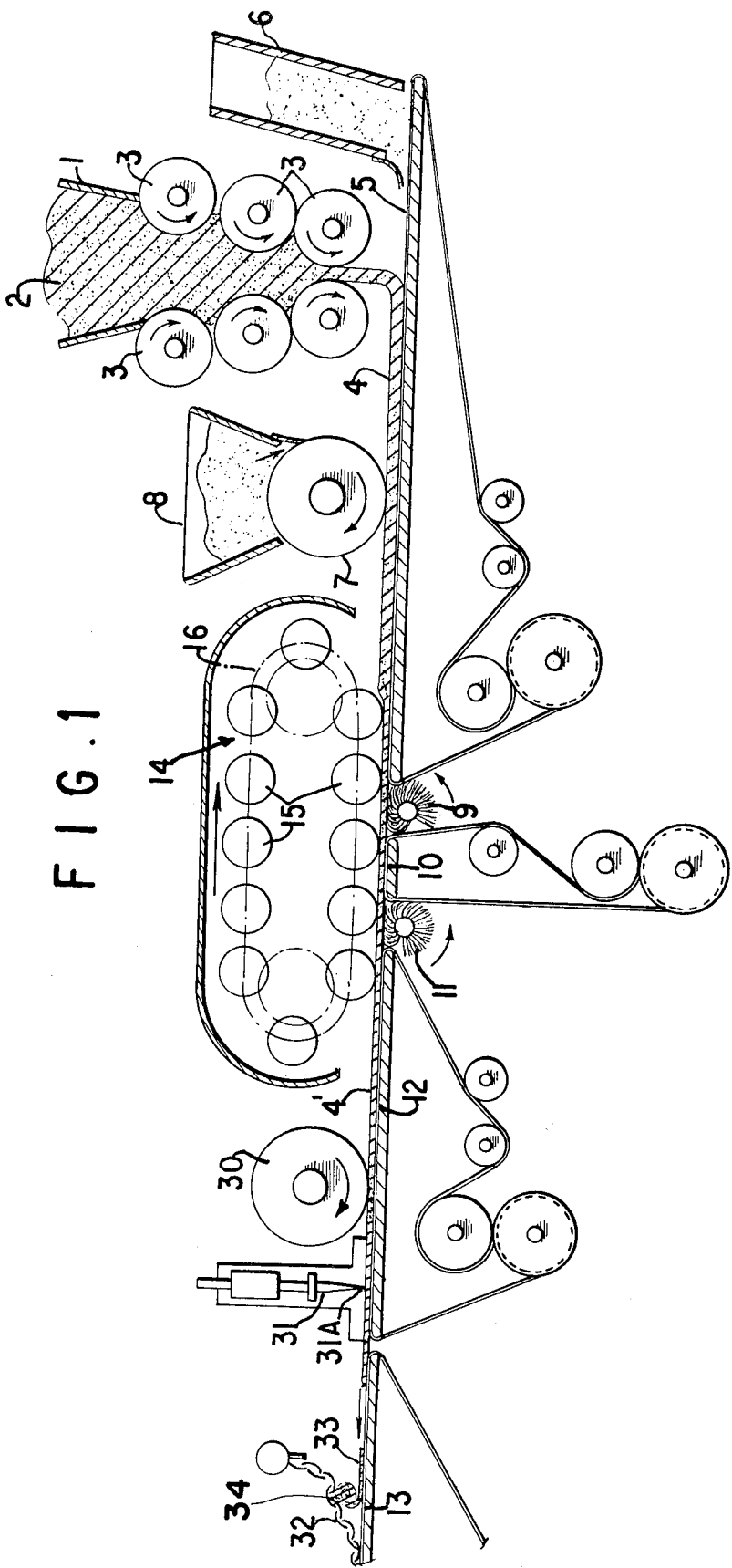
FIG. 1 is a general schematic view of the apparatus used to practice the process of this invention.
Figure 2:
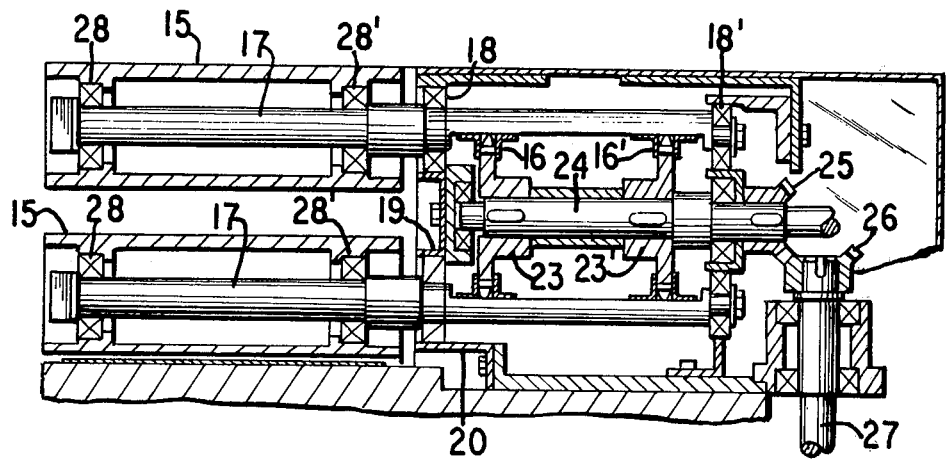
FIG. 2 is a cross-sectional view of an embodiment of the dough flattening apparatus.

A detailed description of the invention is as follows:

FIG. 1 illustrates diagrammatically the complete apparatus and process of the present invention. Dough hopper 1 contains supplied dough 2, which is shaped into a continuous belt-shaped dough mass of a diameter of 50 mm. or more by means of converging pairs of rollers 3 provided immediately below the hopper 1 or otherwise positioned one upon, and adjacent to, the other. Said belt-type or bar-type dough is conveyed by belt conveyor 5 extending horizontally beneath the rollers 3 to the next station.

Dusting flour may be thinly distributed over the upper surface of the belt conveyor 5 by a dusting flour feed device 6 positioned on the belt conveyor 5 upstream of the rollers 3.

Over roller 7 is installed a dusting flour hopper 8 which continuously supplies roller 7 with dusting flour. Roller 7, which is positioned above the belt conveyor 5 downstream of the rollers 3, is adapted for slightly pressing against the upper surface of the belt-type dough 4 and for applying dusting flour thereon.

Dough 4, after leaving belt conveyor 5, passes over brush roll 9 positioned downstream of belt conveyor 5, is carried by belt conveyor 10, passes over revolving brush roll 11 and is then transferred onto belt conveyor 12 and, finally, onto belt conveyor 13 in its progress through the apparatus.

The operating speed of each of the above-mentioned belt conveyors is greater than that of the adjacent upstream belt conveyor.

Brush roll 9 between belt conveyors 5 and 10 and brush roll 11 between belt conveyors 13 and 12 detach any portions of the dough surface which have adhered to or attached to the surface of the upstream belt and transfer the dough 4 onto the downstream belt, as well as aiding the dough stretching apparatus 14, located above the belt, in freely stretching the dough.

Figure 3:
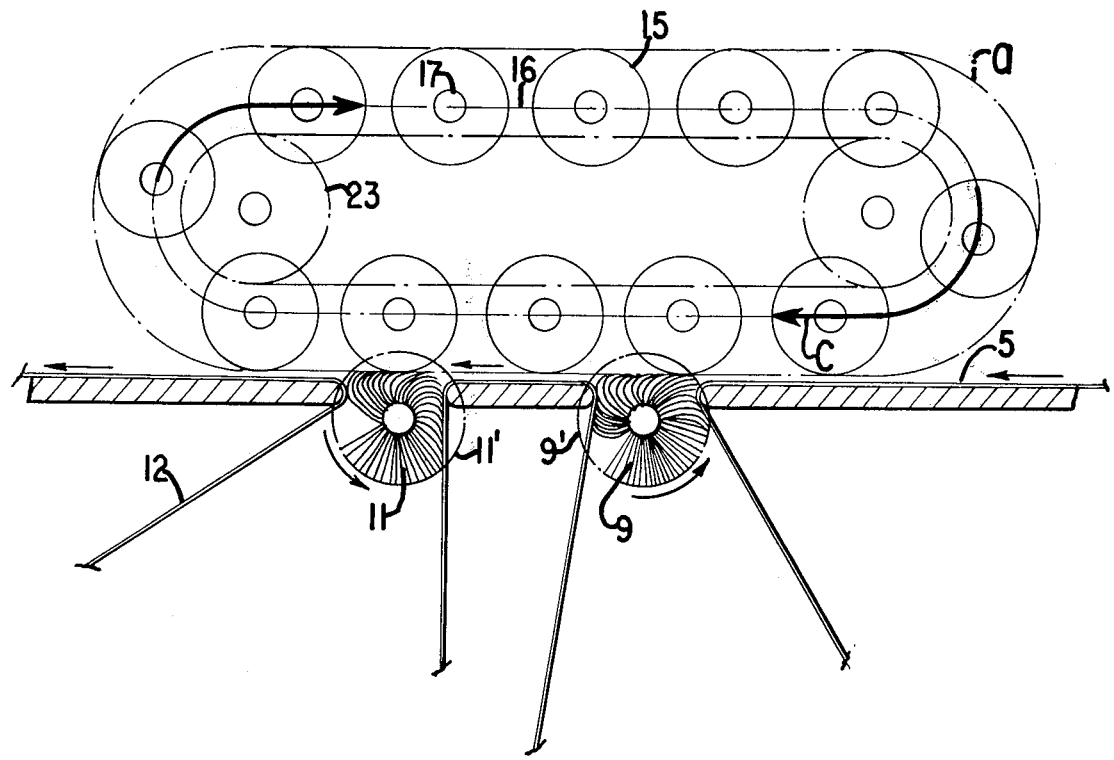
FIG. 3 is a schematic view of a portion of the apparatus used to flatten the dough after dusting.

Stretching mechanism 14 comprises principally a plurality of planetary rolls 15 which move in orbit and are rotatable about their axes. The orbit of revolution is elliptical, as illustrated in FIG. 3 with reference to path a.

The apparatus for causing planetary rollers 15 to move along ellipse a comprises a plurality of shafts 17 each secured at the spaced apart portions thereof to chains 16 and 16′, rolls 18 and 18′ provided on shaft 17, a guide rail 19 and 20 for operation of rolls 18 and 18′, sprockets 23 and 23′ for driving chains 16 and 16′, a shaft 24 for sprockets 23 and 23′, bevel gears 25 and 26 which rotate shaft 24 and shaft 27 of bevel gear 26. Rotation of shaft 27 causes, through bevel gears 25 and 26, sprockets 23 and 23′ to rotate, thereby driving chains 16 and 16′. The path of the chains is made elliptical by means of guide rails 19 and 20, which are formed generally in at least a portion of ellipse a and c in FIG. 3.

Shafts 17, secured to chains 16 and 16′, are mounted with planetary rolls 15 through bearings 28 and 28′. Planetary rolls 15 are rotatable relative to shaft 17 be means of bearings 28 and 28′.

Summarizing the above, planetary rolls 15 are moved along an elliptical path by shaft 17, and may simultaneously rotate about their axes. The direction of progress of the planetary rolls 15 along the upper horizontal portion of elliptical path a (FIG. 3) is opposite to that of belt conveyors 5, 10 and 12. The gap between the lower horizontal position of elliptical path a and the belt conveyors is about 5 mm. where dough 4 enters at the upstream end and about 1 to 2 mm. at the downstream exit.

Accordingly, by moving chains 16 and 16′ more rapidly than any of belt conveyors 5, 10 and 12, planetary rolls 15 rotate in the direction shown by arrows b when caused to make contact with dough 4, as shown in FIG. 4. Thus, planetary rolls 15 move forward while rotating on dough.

Elaborating on the functions of planetary rolls 15 and their effects upon dough 4, as such rolls initially contact dough 4, they "beat" and compress the dough, thereby collapsing gas bubbles in dough 4 and eliminating pores in, and increasing the density of said dough, the inside of which is initially spongy because of gas bubbles therein. Further, experiments have shown that the higher the speed of chains 16 and 16′, the better is the dynamic vibratory effect of the repeated "beating" of the rollers on the dough.

Unless the apparatus and process of the present invention is employed, as explained hereinafter, planetary rolls 15, rotating and pushing dough 4 forward, would cause formation of a bulge 29 of dough in front of such rolls. This bulge does not form because of the pulling action of belt conveyor 10, operating at a velocity faster than that of belt conveyor 5 and downstream planetary roll 15, whose speed in turn is greater than that of conveyor 10. The dough is stretched forward, where a bulge might otherwise be formed. Planetary rolls 15 always roll over the flat surfaces of dough 4, pulling and evening the dough, rather than flattening the dough by vertically downward pressure and thereby readily form an extremely thin dough strip even from highly resilient dough. This is accomplished without damaging the gluten tissues of the dough.

The greater the number of planetary rolls 15 mounted on chain 16, and of dough transferring conveyors 5, 10, 12, whose speed gradually increases from one to another downstream, the better are the results. A larger number of conveyors also reduces the length of travel of dough on each of the conveyors, thereby reducing the possibility of the dough adhering to the conveyors.

Between said belt conveyors are disposed brush rolls 9 and 11 whose shafts are provided with long hair bristles to form a brush in order to enhance the above effects. Such disposition of said brush rolls has the function of transferring dusting flour onto the upper surface of the next downstream belt conveyor as well as that of securely transferring dough, which tends to adhere to the belt conveyor, onto the next belt conveyor, as mentioned above. Furthermore, when planetary roll 15 passes over the brush rolls, the brush hair is bent, thus causing the brush rolls to operate in the manner of ordinary flat conveyors and, in such manner, increasing the total number of conveyors. When the planetary rolls are not passing over the brush rolls, the hair of the brush rolls moves along a circular path as shown by 9' and 11', pressing dough upwardly, thereby automatically adjusting the stretching of the dough.

After passing through dough stretching apparatus 14, the dough is then passed under roller 30. The function of roller 30 is not to stretch the dough, but mainly to limit the contraction of the dough which would otherwise occur through its resiliency. In other words, when dough 4 reaches conveyor belt 12 and has been released from stretching by planetary rolls 15, dough contracts in the axial direction, and increases in thickness to some extent. To avoid such contraction, roll 30 is operated at the same speed as belt conveyor 12, to nip the dough between itself and the conveyor belt 12. The dough is then transferred to the next station.

Cutter 31 is equipped with a sharp edge 31A and cuts the stretched dough into predetermined lengths; cutter 31 is conventionally power-operated. Cutter 31 cuts by means of vertical up and down motions, which are adjustable by means of any suitable conventional speed control mechanism to vary the timing between the cutting strokes.

The thus cut dough 33 is transferred onto belt conveyor 13 operated at a speed substantially greater than that of belt conveyor 12 and is then rolled by a mesh-type net 32 into a mass cylindrical in cross section 34 shown in FIGS. 1 and 6. The speed of belt conveyor 13 is preferably more than twice that of belt conveyor 12.

Product 34 can be directly put into a final proofer for fermentaion, without undergoing prior intermediate fermentation, and baked into bread or like products of high quality.

What is claimed is:

1. A method of producing bread dough comprising:
   (a) forming the dough into a strip;
   (b) placing said strip on a moving conveyor belt constituting the first in a series of conveyor belts;
   (c) applying pulling forces to said strip by moving each of said belts in said series at a speed faster than the adjacent upstream conveyor belt while simultaneously applying repeated compressive forces to said strip and avoiding flattening of the dough by vertical downward pressure while said dough is being pulled by said series of conveyor belts to aid in reducing said strip to a thickness of from about 1 mm to about 4 mm without damaging the gluten tissue of the dough said compressive forces being applied by a plurality of rollers rotatably moving in an endless roller path extending over each of said conveyor belts so as to roll along said strip in the same direction of travel as said conveyor belts;
   (d) subsequently cutting said strip into lengths; and
   (e) forming layered masses of said dough from said lengths.

2. A method according to claim 1, further comprising the step of limiting the contraction of said strip, after it passes said rollers, by passing the strip under a roller rotating at a speed whereby the peripheral surface thereof moves at substantially the same speed as said strip.

3. A method according to claim 1, wherein said layered masses are formed by rolling said lengths into respective substantially cylindrical bodies.

* * * * *